United States Patent [19]
Gregg et al.

[11] Patent Number: 5,421,845
[45] Date of Patent: Jun. 6, 1995

[54] LOW PRESSURE PULSE JET DUST COLLECTOR

[75] Inventors: William Gregg, Basking Ridge; Randall Vendetti, Lake Hiawatha; Robert Lindsay, Succasunna; Joseph Matrisciano, Westfield; Giambattista Giusti, New Providence, all of N.J.

[73] Assignee: Hosokawa Micron International Inc., New York, N.Y.

[21] Appl. No.: 122,707

[22] Filed: Sep. 16, 1993

[51] Int. Cl.⁶ .............................................. B01D 46/04
[52] U.S. Cl. ......................................... 55/294; 55/302
[58] Field of Search .................... 55/302, 294; 95/279, 95/280

[56] References Cited

U.S. PATENT DOCUMENTS

| | | | |
|---|---|---|---|
| 3,487,609 | 1/1970 | Caplan | 95/280 |
| 3,543,481 | 12/1970 | Pausch | 55/302 X |
| 3,648,442 | 3/1972 | Bourne | 55/294 |
| 3,832,832 | 9/1974 | Hoon, Jr. | 55/302 |
| 3,951,627 | 4/1976 | Barr, Jr. et al. | 55/294 X |
| 4,157,899 | 6/1979 | Wheaton | 55/302 X |
| 4,233,041 | 11/1980 | Noland | 55/294 X |
| 4,306,890 | 12/1981 | Gustavsson et al. | 55/302 X |
| 4,539,025 | 9/1985 | Ciliberti et al. | 55/302 |
| 4,544,389 | 10/1985 | Howeth | 55/302 |
| 4,637,473 | 1/1987 | Gillis et al. | 55/302 X |
| 4,655,799 | 4/1987 | Bosworth et al. | 55/294 X |
| 5,062,873 | 11/1991 | Karlsson | 55/302 |

Primary Examiner—Richard L. Chiesa
Attorney, Agent, or Firm—Nims, Howes, Collison, Hansen & Lackert

[57] ABSTRACT

The present invention shows a cleaning system for dislodging the collected dust from filter media in a low pressure high capacity gas stream filter. In the preferred embodiment, pressurized gas from an external tank is ducted through a revolving arm which stretches radially across a pie-shaped segment of a tube sheet separating a clean gas plenum from a dirty gas plenum in a bag collection gas filtration system. The ducted gas is intermittently discharged from the rotating arm through multiple orifices into a venturi contained within the openings in the tube sheet as these orifices are above the individual filter elements.

7 Claims, 2 Drawing Sheets

LOW PRESSURE PULSE JET DUST COLLECTOR

BACKGROUND OF THE INVENTION

1. Field of the Invention

The present invention relates to an apparatus for the collection of dust from a gaseous stream, and particularly, low pressure pulsed cleaning of filter bags in a bag collection gas filtration system. In particular, the present invention relates to a cleaning system for dislodging dust from a high capacity gas stream filter, said filter having a dirty gas plenum contiguous with a clean gas plenum, said clean gas plenum and dirty gas plenum being separated by an intermediate tube sheet having therein an array of openings, such that said tube sheet may be viewed as having a plurality of pie-shaped radial segments, with each such radial segment having a fixed array of openings, which array may vary from one radial segment to another, but which array contains substantially the same number of openings in approximately the same positions as the openings of each other radial segment, and employing gas-permeable filter media having mouths communicating with said clean gas plenum, demountably attached to said openings in said intermediate tube sheet and extending into the space defined by said dirty gas plenum, for the collection of dust, which cleaning system comprises:

a cleaning gas supply means external to said gas stream filter for supplying a quantity of pressurized gas;

a pressurized gas distribution arm within said clean gas plenum and spanning a pie-shaped segment of said tube sheet extending radially between approximately the center position and approximately the outer edge of said clean gas plenum, said arm being in fluid communication with said external gas supply means, and being rotatable about said center position;

a plurality of filter elements, each said element comprising:
  an opening in said intermediate tube sheet;
  a filter medium, such as a gas-permeable bag, demountably attached to said opening, and extending into the space defined by said dirty gas plenum from said opening, and having a mouth communicating with said clean gas plenum; and,
  a venturi nozzle positioned centrally within said mouth;

a plurality of outlet orifices in fluid communication with said external gas tank, and positioned on the side of said arm facing said tube sheet, a sufficient quantity of said orifices being present to communicate with the all of said filter elements in each radial segment;

a drive means capable of rotating said arm about said center position, bringing the orifices of said arm into alignment with the filter elements of each radial segment in a sequential manner; and, control means capable of releasing a controlled low pressure pulse of gas from said external tank, through said plurality of orifices, into the venturi nozzles of said filter elements, as the orifices of said arm are positioned over the filter elements of a radial segment.

2. Description of Related Art

Gas stream filtration has been known for many years, and one popular method of providing such filtration is to pass the dust-laden gas, such as air from an industrial process, from a dirty gas plenum to a clean gas plenum through a filtration media. One of the most common of such media are gas permeable natural or synthetic cloth bags, although porous foam or pleated filter media cartridges or metallic mesh tubes are known or suggested for this use as well, which are hung from openings in the partition, or tube sheet, between the two plenums. Gas passes through the porous surface of the cloth bag, but the dust and any particulate material is trapped on the outside surface of the bag.

As the filter is employed, however, dust building up on the outside surface of the filter media elements reduces efficiency and would eventually render the filter inoperative. Various systems have been proposed to deal with such dust and particulate materials. In general, the systems have comprised back-flushing the filter media with a pulse of gas, and various references have dealt with the supply of such back-flushing gas into the filter media. It would, for example, be possible to periodically pressurize the clean gas plenum, or de-pressurize the dirty gas plenum, causing a back-flow of gas reversibly through the filter media. This would however, require an enormous volume of gas and would take the entire filter off-line for the time required.

One solution which has found favor has been to include a traveling arm or bar in the clean air plenum which is connected to orifices over the filter elements. This arm or bar typically revolves above the tube sheet from which the filter media depend. In earlier versions of these kind of apparatus, a constant volume of gas was discharged from these orifices, which back-flushed the cleaning elements as the orifices passed over the filter elements. Later versions of this technology attempted to pulse the flow of cleaning gas only when the orifices were in position over the filter elements.

One problem with such an apparatus, however, is the volume of gas required to perform this function. Constant gas supply systems required an enormous gas supply, and intermittent supply systems, while they required less, involved more complicated mechanical systems. In addition, the pressure drop from the pressurized gas source, such as a gas accumulation tank, to the orifices exacerbated the problem. In order to reduce the volume of gas required, many systems placed a gas accumulator tank within the clean air plenum, reducing the length of the gas supply assembly. While this was an adequate solution for many purposes, the presence of an accumulator tank and its complicated electrical and mechanical systems limited the applications of this technology to environments which were not destructive of the equipment.

Movement of the cleaning gas supply outside the clean air plenum, however, increased the systemic pressure drop, and required significantly higher pressure systems to be operative.

U.S. Pat. No. 3,487,609 to Caplan is entitled METHOD AND APPARATUS FOR FILTERING A GASEOUS MEDIUM. This reference shows a system for cleaning filter bag elements in which a positive reverse flow of clean gas is directed into the outlet of each filter bag.

U.S. Pat. No. 3,543,481 to Pausch is entitled HIGH PRESSURE CLEANING OF DUST SEPARATING APPARATUS. This reference shows a method and apparatus for dislodging dust from a porous filtering surface, embodying the use of high pressure gas emitted from a reservoir in such a manner as to impart a high pressure shock to one or more porous filtering surfaces to dislodge heavily compacted solids therefrom.

U.S. Pat. No. 3,648,442 to Bourne is entitled DUST COLLECTORS. This reference shows a filtering system in which trapped dust is dislodged by reversing the flow of air through the bag walls sequentially. The dust which then falls to the floor of the dirty air plenum is then swept toward an exhaust port and discharged.

U.S. Pat. No. 3,832,832 to Hoon is entitled METHOD AND APPARATUS FOR CLEANING THE FILTER ELEMENTS OF A DUST COLLECTOR. This reference shows a bag type filtration system in which the filter elements are periodically cleaned by reversing the direction of air flow and immediately restoring the normal air flow within a period of a fraction of a second.

U.S. Pat. No. 3,951,627 to Barr and Mullinax is entitled AIR FILTERING APPARATUS. This reference shows a filtering apparatus providing intermittent reverse flow to dislodge accumulated material.

U.S. Pat. No. 4,157,899 to Wheaton is entitled PULSED BACKFLUSH AIR FILTER. This reference shows a cleaning system for sleeve-type air filters in which a rotating arm is periodically supplied with pulsed air at pressure to randomly backflush the sleeves.

U.S. Pat. No. 4,233,041 to Noland is entitled BAGHOUSE WITH ROTATING SWEEP ARM. This reference shows a cleaning arm for a cylindrical baghouse pivoting centrally within the clean air plenum with a cam controlled valve to provide backflushing air to successive concentric rings of filter bags with each full revolution of the cleaning arm.

U.S. Pat. No. 4,306,890 to Gustavsson and Valli is entitled APPARATUS FOR CLEANING OF FILTER ELEMENTS. This reference shows an apparatus for cleaning filter cells grouped around a common center with a pulse of compressed air. A gooseneck shaped duct rotates about a central axis and pulses compressed air when it is centered over a filter elements.

U.S. Pat. No. 4,539,025 to Ciliberti and Lippert is entitled FILTERING SYSTEM. This reference shows a filter system in which a cylindrical shell is provided with a central filter tube. This arrangement may be subjected to a periodic backflush with a jet pulse intended to flex the filter tube and dislodge collected solids.

U.S. Pat. No. 4,544,389 to Howeth is entitled MULTIPLE JET BACKFLUSHED AIR FILTER. This reference shows a porous media type air filter unit having a multiple jet reverse flow cleaning system for the filter element wherein a substantial volume of jet cleaning air and entrained ambient air are used to flush the filter element to remove accumulated dust particles.

U.S. Pat. No. 4,655,799 to Bosworth, Adams and Wheaton is entitled PULSE CLEANING SYSTEM FOR DUST FILTERS. This reference shows a cleaning system for dislodging dust from the filter bags of a dust filtration system in which the tube sheet from which the bags depend is divided into segments having filter bag openings arranged in the same pattern. A revolving air-accumulator tank is supplied with compressed air is contained within the clean air plenum and connected with a distribution arm which supplies air pulses to the filter bags through an array of discharge nozzles arranged in the same pattern as the filter bag openings.

SUMMARY OF THE INVENTION

It is an object of the present invention to provide a low pressure cleaning system for a high volume gas stream filtration system.

It is a further object to provide a low pressure cleaning system for a high volume gas stream filtration system in which the pressurized gas tank is external to the gas stream The other objects, features and advantages of the present invention will become more apparent in light of the following detailed description of the preferred embodiment thereof.

According to the preferred embodiment of the present invention, there is provided a cleaning system for dislodging dust from a high capacity gas stream filter, said filter having a dirty gas plenum contiguous with a clean gas plenum, said clean gas plenum and dirty gas plenum being separated by an intermediate tube sheet having therein an array of openings, such that said tube sheet may be viewed as having a plurality of pie-shaped radial segments, with each such radial segment having a fixed array of openings, which array may vary from one radial segment to another, but which array contains substantially the same number of openings in approximately the same positions as the openings of each other radial segment, and employing gas-permeable filter media having mouths communicating with said clean gas plenum, demountably attached to said openings in said intermediate tube sheet and extending into the space defined by said dirty gas plenum, for the collection of dust, which cleaning system comprises:

a cleaning gas supply means external to said gas stream filter for supplying a quantity of pressurized gas;

a pressurized gas distribution arm within said clean gas plenum and spanning a pie-shaped segment of said tube sheet extending radially between approximately the center position and approximately the outer edge of said clean gas plenum, said arm being in fluid communication with said external gas supply means, and being rotatable about said center position;

a plurality of filter elements, each said element comprising:
   an opening in said intermediate tube sheet;
   a filter medium, such as a gas-permeable bag, demountably attached to said opening, and extending into the space defined by said dirty gas plenum from said opening, and having a mouth communicating with said clean gas plenum; and,
   a venturi nozzle positioned centrally within said mouth;

a plurality of outlet orifices in fluid communication with said external gas tank, and positioned on the side of said arm facing said tube sheet, a sufficient quantity of said orifices being present to communicate with the all of said filter elements in each radial segment;

a drive means capable of rotating said arm about said center position, bringing the orifices of said arm into alignment with the filter elements of each radial segment in a sequential manner; and, control means capable of releasing a controlled low pressure pulse of gas from said external tank, through said plurality of orifices, into the venturi nozzles of said filter elements, as the orifices of said arm are positioned over the filter elements of a radial segment.

DETAILED DESCRIPTION OF THE PREFERRED EMBODIMENT

Figure 1:
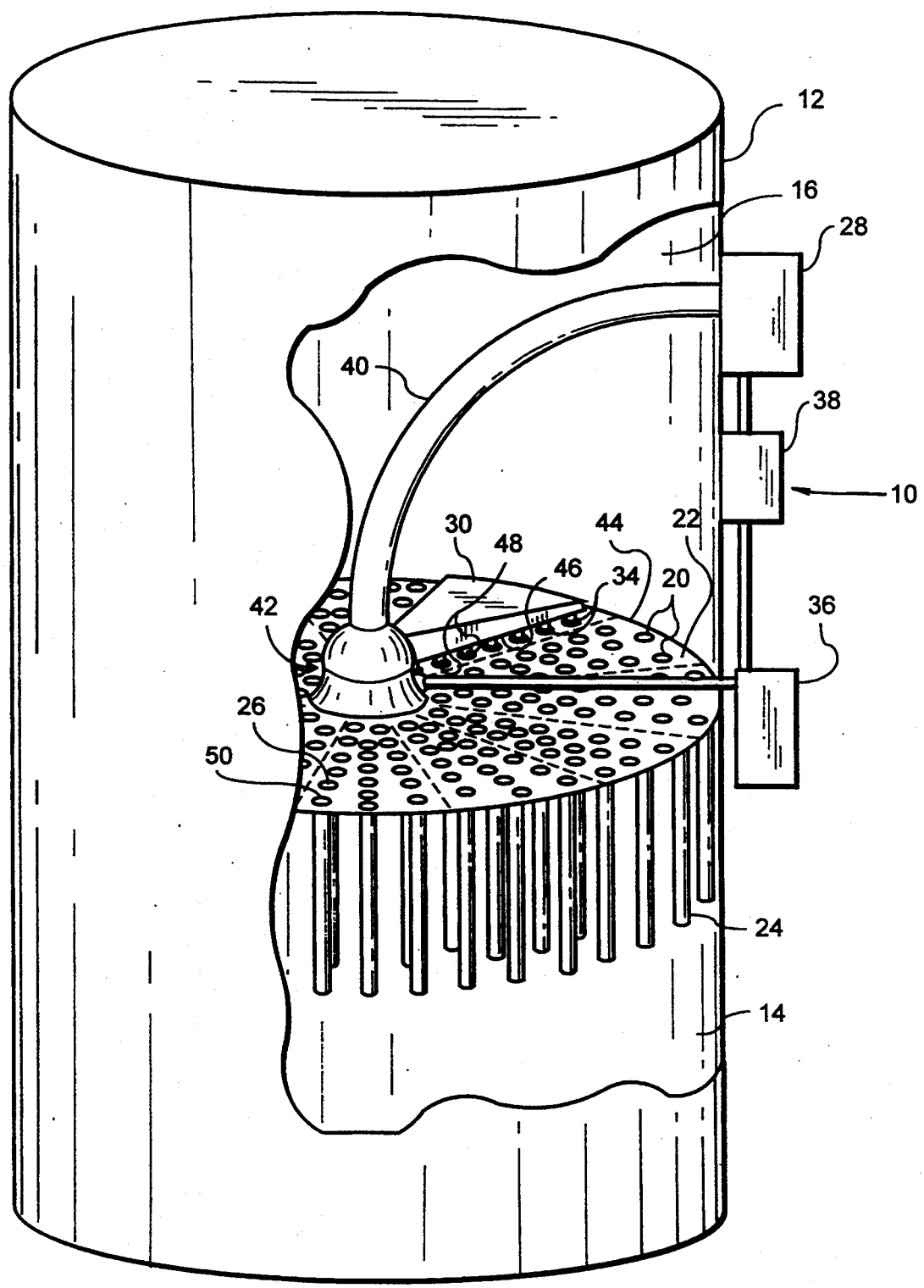
FIG. 1 shows a broken-away perspective view of the cleaning system of the present invention in place within a high volume gas filtration system.

As noted previously, FIG. 1 shows a broken-away perspective view of the cleaning system 10 of the present invention in place within a high volume gas filtration system 12. As shown in FIG. 1, the present invention discloses a cleaning system 10 for dislodging dust from a high capacity gas stream filter 12. The filter 12 has a dirty gas plenum 14 disposed below a clean gas plenum 16, and the clean gas plenum 16 and dirty gas plenum 14 are separated by an intermediate tube sheet 18. This tube sheet 18 has an array of openings 20, such that the tube sheet 18 may be viewed as having a plurality of pie-shaped radial segments 22, with each such radial segment 22 having a fixed array of openings 20. This array may vary from one radial segment 22 to another, but each array contains substantially the same number of openings 20 in approximately the same positions as the openings of each other radial segment 22. In addition, the filter 12 employs filter media, typically gas-permeable bags 24, although porous foam or pleated filter media cartridges or metallic mesh tubes are known or suggested for this use as well. These gas-permeable bags 24 have bag mouths 26 communicating with the clean gas plenum 16, and are suspended from said openings 20 in said intermediate tube sheet 18 into the space defined by said dirty gas plenum 14, for the collection of dust.

It is within this filter 12 that the cleaning system 10 of the present invention operates. The cleaning system of the present invention comprises an external gas supply means 28, a pressurized gas distribution arm 30, a plurality of filter elements 32, a plurality of distribution outlet orifices 34, drive means 36, and control means 38.

The external gas supply means 28 of the present invention should ideally be located proximate to the clean gas plenum 16 in order to minimize the pressure drop throughout the cleaning system 10. Locating the external gas supply means 28, which may be a compressor driven compressed gas tank, an accumulator tank, or any other similar mechanism known to the art, outside the filter 12 has many advantages. First among these is the ability to service any component parts without the need to shut down the filter operation or enter the filter 12. This is of particular importance where the gas stream is toxic or inert, when the filter has to be flushed and provided with a breathable atmosphere before maintenance can be carried out.

In addition, movement of the external gas supply means 28 outside of the filter 10 should increase the lifetime of any component parts, since the environment within the filter 12 is typically more harsh.

Finally, placement of the gas supply means 28 external to the filter 12 environment should assist is meeting more stringent fire code requirements promulgated by various local and national authorities, possibly including explosion-proof requirements.

The purpose of the external gas supply means 28 is to supply a required quantity of pressurized gas, and this pressurized gas is supplied, via gas conduit 40 to pressurized gas distribution arm 30. This pressurized gas distribution arm 30 is positioned at the center position 42 of said tube sheet 18 within said clean gas plenum 16. The arm 30 increases in dimension so as to span a pie-shaped segment 22 of said tube sheet 18 extending radially approximately to the outer edge 44 of said clean gas plenum 16. The arm 30 is in fluid communication with said external gas supply means 28, via said gas conduit 40, and is rotatable about said center position 42.

Along the downward facing portion 46 of pressurized gas distribution arm 30, are located a plurality of distribution outlet orifices 48. These outlet orifices 48 are in fluid communication with said external gas supply means 28. In the preferred embodiment of the present invention, there is provided a sufficient quantity of said outlet orifices 48 to fluidly communicate with the all of filter elements 32 in each radial segment 22, although this number may vary from one segment to another.

Figure 2:
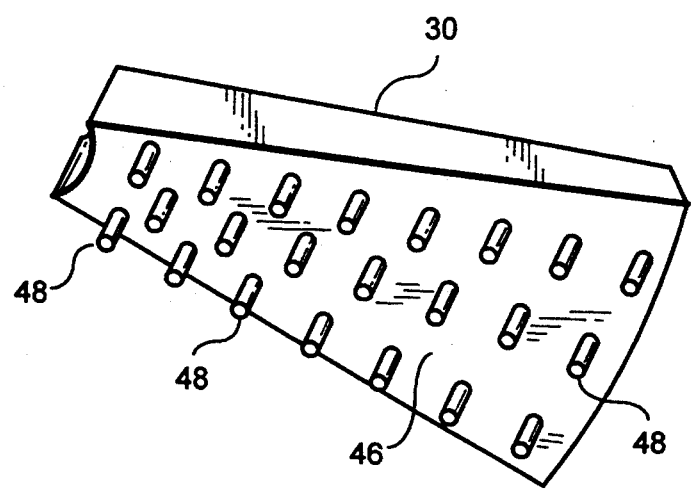
FIG. 2 shows greater detail of the rotating arm and orifices of the present invention.

FIG. 2 shows greater detail of the rotating pressurized gas distribution arm 30 and distribution outlet orifices 48 of the present invention.

With further reference to FIG. 1, there is also shown a plurality of filter elements 32. Each of these filter elements 32 comprises an opening 20 in the tube sheet 18, a gas-permeable bag 24, and a venturi nozzle 50.

As described above, the tube sheet 18 of the filter 12 is provided with a plurality of openings 20, arranged in an array, which may vary from segment to segment, but which are substantially the same in number and location for each segment. Within each of these openings 20 is provided a gas-permeable bag 24, suspended from said opening 20 into the space defined by the dirty gas plenum 14. Further, each of these gas-permeable bags 24 has a bag mouth 26, communicating with the clean gas plenum 16.

Figure 3:
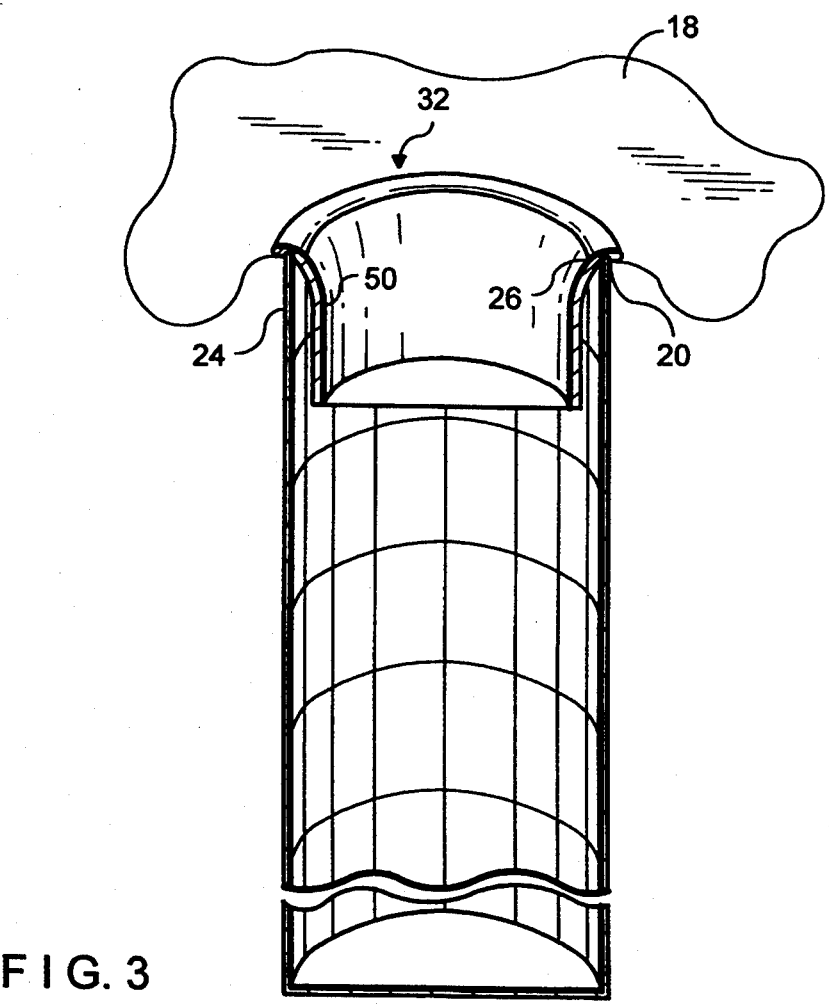
FIG. 3 is a cross-section showing greater detail of a filter element of the present invention.

Details of these filter elements 32 can be better seen in FIG. 3, which shows, in cross-section, greater detail of a filter element of the present invention. As seen therein, filter element 32 comprises opening 20 in the tube sheet 18, a filter medium, such as the gas-permeable bag 24, and venturi nozzle 50. Other filter media could be substituted for the gas-permeable bag 24, such as porous foam or pleated filter media cartridges or metallic mesh tubes, are known or suggested for this use. Use of the gas-permeable bag 24, however, is often supplemented by wire cage 25 to assist in positioning bag 24 for use.

The venturi nozzle 50 is positioned centrally within the mouth 26 of gas-permeable bag 24 or other filter medium, and assists in the cleaning of said bag 24. When pressurized gas from an outlet orifice is directed into the bag mouth 26 of a bag 24 of a filter element 32, the pressurized gas flow transits the venturi nozzle 50, as well. When this happens, additional gas contained with the clean gas plenum is drawn along with the pressurized gas by the well-known venturi effect. This additional gas, together with the pressurized gas flow, has the effect of providing a pulsed gas flow equivalent to a much higher pressurized gas flow.

In this manner, the cleaning system 10 of the present invention is able to provide a cleaning pulse equivalent to a system without the pressure loss normally incurred by the removal of the gas supply means to the outside of the clean gas plenum.

With renewed attention to FIG. 1, there is also shown a drive means 36 capable of rotating pressurized gas distribution arm 30 about the center position 42 of tube sheet 18. Doing so, will bring the distribution outlet orifices 34 of the arm 30 into alignment with the filter elements 32 of each radial segment 22 in a sequential manner.

In addition, the present invention is further provided with control means 38 capable of providing release of a controlled low pressure pulse of gas from said external gas supply means 28. This gas pulse traverses through said gas conduit 40 and said pressurized gas distribution arm 30, and then through said plurality of distribution outlet orifices 48, while the outlet orifices 48 are aligned over the filter elements 32 contained in one segment 22 of said tube sheet 18. This gas pulse is directed into the venturi nozzle 50 of each said filter element 32, as the distribution outlet orifice 34 of said pressurized gas distribution arm 30 is positioned over each filter element 32 in that radial segment 22.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A cleaning system for dislodging dust from a high capacity gas stream filter, said filter having a dirty gas plenum contiguous with a clean gas plenum, said clean gas plenum and dirty gas plenum being separated by an intermediate tube sheet having therein an array of openings, such that said tube sheet may be viewed as having a plurality of pie-shaped radial segments, with each radial segment having a fixed array of openings, which array may vary from one radial segment to another, but which array contains substantially the same number of openings in approximately the same positions as the openings of each other radial segment, and employing gas-permeable filter media having mouths communicating with said clean gas plenum, demountably attached to said openings in said intermediate tube sheet and extending into the space defined by said dirty gas plenum, for the collection of dust, said cleaning system comprising:

a cleaning gas supply means external to said gas stream filter for supplying a quantity of pressurized gas;

a pressurized gas distribution arm within said clean gas plenum and spanning a pie-shaped segment of said tube sheet extending radially between approximately the center position and approximately the outer edge of said clean gas plenum, said arm being in fluid communication with said external gas supply means, and being rotatable about said center position;

a plurality of filter elements, each said element comprising:

an opening in said intermediate tube sheet;

a filter medium comprising a gas-permeable bag, demountably attached to said tube sheet opening, and extending into the space defined by said dirty gas plenum from said tube sheet opening, and having a mouth communicating with said clean gas plenum; and, a venturi nozzle positioned centrally within said mouth;

a plurality of outlet orifices in fluid communication with said external cleaning gas supply means, and positioned on the side of said arm facing said tube sheet, a sufficient quantity of said orifices being present to communicate with all of said filter elements in each radial segment;

a drive means for rotating said pressurized gas distribution arm in a sequential manner about said center position, to bring the orifices of said arm into alignment with the filter elements of each radial segment in a sequential manner, and control means for directing the release of a controlled low pressure pulse of gas from said external gas supply means through said plurality of orifices, into the venturi nozzles of said filter elements, when the orifices of said arm are positioned over the filter elements of a radial segment.

2. The cleaning system of claim 1 wherein the filter medium is a gas-permeable bag.

3. The cleaning system of claim 1 wherein the filter medium is a porous foam cartridge.

4. The cleaning system of claim 1 wherein the filter medium is a pleated cartridge.

5. The cleaning system of claim 1 wherein the filter medium is a metallic mesh tube.

6. The cleaning system of claim 1 wherein the distribution arm is driven from the central position of said tube sheet.

7. The cleaning system of claim 1 wherein the distribution arm is driven from the outer edge of said tube sheet.

* * * * *